(12) United States Patent
Slovacek

(10) Patent No.: US 9,503,349 B2
(45) Date of Patent: Nov. 22, 2016

(54) COMPLEX INTERACTION RECORDING

(71) Applicant: ZOOM INTERNATIONAL S.R.O., Prague (CZ)

(72) Inventor: Vaclav Slovacek, Prague (CZ)

(73) Assignee: ZOOM INTERNATIONAL s.r.o., Prague (CZ)

(*) Notice: Subject to any disclaimer, the term of this patent is extended or adjusted under 35 U.S.C. 154(b) by 0 days.

(21) Appl. No.: 14/284,366

(22) Filed: May 21, 2014

(65) Prior Publication Data

US 2014/0250227 A1 Sep. 4, 2014

Related U.S. Application Data

(63) Continuation-in-part of application No. 13/620,715, filed on Sep. 15, 2012, now Pat. No. 8,588,111, and a continuation-in-part of application No. 13/359,484, filed on Jan. 26, 2012.

(60) Provisional application No. 61/969,268, filed on Mar. 24, 2014.

(51) Int. Cl.
*H04L 12/26* (2006.01)
*H04M 3/51* (2006.01)
*H04M 3/42* (2006.01)

(52) U.S. Cl.
CPC .......... *H04L 43/10* (2013.01); *H04M 3/42221* (2013.01); *H04M 3/5175* (2013.01); *H04M 3/5191* (2013.01); *H04M 2203/301* (2013.01)

(58) Field of Classification Search
CPC .................................................. H04L 43/10
USPC ................ 370/259, 352; 379/265.02, 201.01
See application file for complete search history.

(56) References Cited

U.S. PATENT DOCUMENTS

| | | | |
|---|---|---|---|
| 5,991,373 A * | 11/1999 | Pattison et al. | 379/93.17 |
| 7,010,109 B2 | 3/2006 | Gritzer et al. | |
| 7,706,817 B2 * | 4/2010 | Bamrah et al. | 455/466 |
| 9,160,852 B2 * | 10/2015 | Ripa | H04M 3/5133 |
| 2002/0064149 A1 * | 5/2002 | Elliott et al. | 370/352 |
| 2004/0162724 A1 * | 8/2004 | Hill et al. | 704/231 |
| 2005/0105712 A1 * | 5/2005 | Williams et al. | 379/265.02 |
| 2006/0262919 A1 * | 11/2006 | Danson et al. | 379/265.02 |
| 2006/0262920 A1 * | 11/2006 | Conway et al. | 379/265.02 |
| 2006/0265090 A1 * | 11/2006 | Conway et al. | 700/94 |
| 2007/0211876 A1 * | 9/2007 | Othmer et al. | 379/201.01 |
| 2007/0255785 A1 * | 11/2007 | Hayashi et al. | 709/204 |
| 2008/0240376 A1 * | 10/2008 | Conway et al. | 379/88.03 |
| 2008/0240405 A1 * | 10/2008 | Conway et al. | 379/265.06 |
| 2008/0260128 A1 * | 10/2008 | Conway et al. | 379/201.02 |
| 2009/0210480 A1 * | 8/2009 | Sivasubramaniam et al. | 709/203 |
| 2009/0240561 A1 * | 9/2009 | Altberg et al. | 705/10 |
| 2010/0211564 A1 * | 8/2010 | Cohen et al. | 707/722 |
| 2012/0321062 A1 * | 12/2012 | Fitzsimmons | H04L 65/4015 379/142.17 |
| 2013/0212242 A1 | 8/2013 | Mendiratta et al. | |

\* cited by examiner

*Primary Examiner* — Parth Patel
(74) *Attorney, Agent, or Firm* — Galvin Patent Law LLC; Brian R. Galvin

(57) ABSTRACT

A system for complex interaction recording, comprising a recording management server that operates on a network-connected computing device and records communications, a record server that operates on a network-connected computing device and presents records for review and interaction by a human user, and an interaction evaluation server that operates on a network-connected computing device and identifies interactions segments and groups them into complex interactions, and a method for recording complex interactions comprising the steps of loading an interaction, identifying segments within the interaction, grouping segments into a complex interaction, and sending the resulting complex interaction as output.

2 Claims, 8 Drawing Sheets

COMPLEX INTERACTION RECORDING

CROSS-REFERENCE TO RELATED APPLICATIONS

This application is a continuation-in-part of U.S. patent application Ser. No. 13/620,715, titled "SYSTEM AND METHOD FOR PASSIVE COMMUNICATION RECORDING", filed on Sep. 15, 2012, and is a continuation-in-part of U.S. patent application Ser. No. 13/359,484, titled "SYSTEM AND METHOD FOR ZERO-FOOTPRINT SCREEN CAPTURE", filed on Jan. 26, 2012, the entire specifications of each of which are incorporated herein by reference in their entirety. This application claims priority to U.S. provisional patent application Ser. No. 61/969,268, titled "COMPLEX INTERACTION RECORDING", which was Mar. 24, 2014, the entire specification of which is incorporated herein by reference.

BACKGROUND OF THE INVENTION

Field of the Art

The disclosure relates to the field of client interactions, and more particularly to the field of recording complex interactions.

Discussion of the State of the Art

In the field of telecommunications, particularly in contact centers, calls are frequently recorded and reviewed for such purposes as monitoring center operations, customer needs, or for reviewing contact center agent performance. Call recordings are typically stored as single data files, according to a specific call that took place. Within a recording there may be multiple participants (such as multiple customers in a single conferenced call), and a particular call may end prior to the end of a customer's actual interaction (such as when a call may have been transferred to another agent, terminating the initial call and beginning a new one). Additionally, further communication such as emails or text messages may be sent between call participants, that may not ordinarily be recorded as part of the interaction.

Traditional approaches of simply recording a call and storing the recording do not accommodate multiple participants well, causing incomplete or congested recordings where multiple parties may be talking over one another, and data may be confused or lost in such instances. Furthermore, communication taking place outside of the call itself, either by alternate communication methods or by communication at different times (such as a follow-up telephone call), are not recorded as the recording is limited in scope to the original call.

What is needed, is a means to identify complex interactions encompassing multiple participants, communication methods, or time periods as necessary, and to further record, store, and present these complex recordings in an appropriate manner for review as needed.

SUMMARY OF THE INVENTION

Accordingly, the inventor has conceived and reduced to practice, in a preferred embodiment of the invention, a system and method for complex interaction recording.

According to a preferred embodiment of the invention, a system for complex interaction recording, comprising a call recording management server that may be a software module operating on a network-connected computing device and that may handle the recording of interactions, a record server that may be a software module operating on a network-connected computing device and that may provide interaction records for review or interaction, and an interaction evaluation server that may be a software module operating on a network-connected computing device and that may identify components of an interaction for use, is disclosed. According to the embodiment, an interaction evaluation server may identify components of an interaction such as to group together as a single complex interaction, for example multiple emails between two parties over time (that may be grouped together as a single email conversation, for example). These interactions may be recorded by a call recording management server, or previous recordings may be rearranged according to a grouping as determined by an interaction evaluation server (for example, if it is later determined that two call records were part of a single interaction). Resulting complex interaction records may be presented to a record server for review or interaction, for example by a human analyst for examination of recordings (for example, for quality analysis purposes, as is common in the art).

According to the embodiment, an "interaction" may comprise a plurality of "segments", each of which may be a conversation or other interaction between multiple parties (such as a contact center agent and a customer, for example) occurring via a single communication method (for example, via telephone call or email). Each segment may further comprise a plurality of "tracks", each of which may be a single activity of a party within a segment (such as a particular email, or the audio collected from one party involved in a telephone call). In this manner, multiple parties, communication methods, or time periods may be grouped together as a single interaction, facilitating the recording of complex interactions that may span a broader scope than currently utilized in the art.

Further according to the embodiment, complex interactions may be stored (such as in a database or on physical storage media) in a multi-part manner, such that separate aspects of an interaction may be stored, reviewed, or modified individually while preserving fidelity of the interaction overall. According to the embodiment, interaction storage may comprise three parts, for storing metadata information, media data, and a "service layer". Metadata storage may comprise the storage of various context-based and other metadata as may be identified, extracted, or generated according to the invention. Media storage may comprise the storage of actual audio, video, speech analytics, screen capture, multi-part media (such as audio with screen capture in one media file), or other such multimedia data. A service layer storage may comprise the storage of information linking or correlating media and metadata cross storage means, such that the service layer effectively manages which stored data elements are a part of any given interaction, as well as where or how to locate and present them as needed. Additionally, in this manner a service layer may maintain consistency between media and metadata, for example by modifying stored correlations or links whenever one or both types of stored data are modified (such as if metadata is updated manually after review by a human analyst, for example). In this manner, a service layer may prevent data from becoming lost, corrupted, or invalidated by future alterations and may, by extension, be used as a form of change tracking or version control, by storing records of prior links, correlations, or changes that were made (for example). Furthermore, a service layer may be utilized at the time of storage to determine where or how to store various data elements, for example by reviewing current utilization of various storage media (to evenly distribute the quantity of stored data and not consume individual storage media, for example) or to best utilize various performance or features of particular storage means (such as using high-speed storage for data that may change or be referenced frequently, or using high-longevity storage for data that may change infrequently but is needed to be retained for a long time period).

According to another preferred embodiment of the invention, a method for complex interaction recording comprising the steps of loading an interaction (such as by monitoring an interaction as it is taking place, or by retrieving a previously-stored interaction for analysis), identifying interaction segments (such as determining the parties involved in a telephone call and associating each party with their respective audio stream), identifying interaction context (such as identifying when a future call was scheduled, or other additional interaction elements), optionally identifying interaction segments based on identified context (such as retrieving call records for a scheduled call as described above, and performing interaction analysis on those records), grouping interaction segments into a complex interaction (such as grouping multiple calls concerning a single customer together as a single complex interaction associated with that customer), and finally sending the resulting complex interaction recording as output to be optionally stored, viewed, interacted with, or any other potential use for an interaction record.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, in a preferred embodiment of the invention, a system and method for complex interaction recording.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
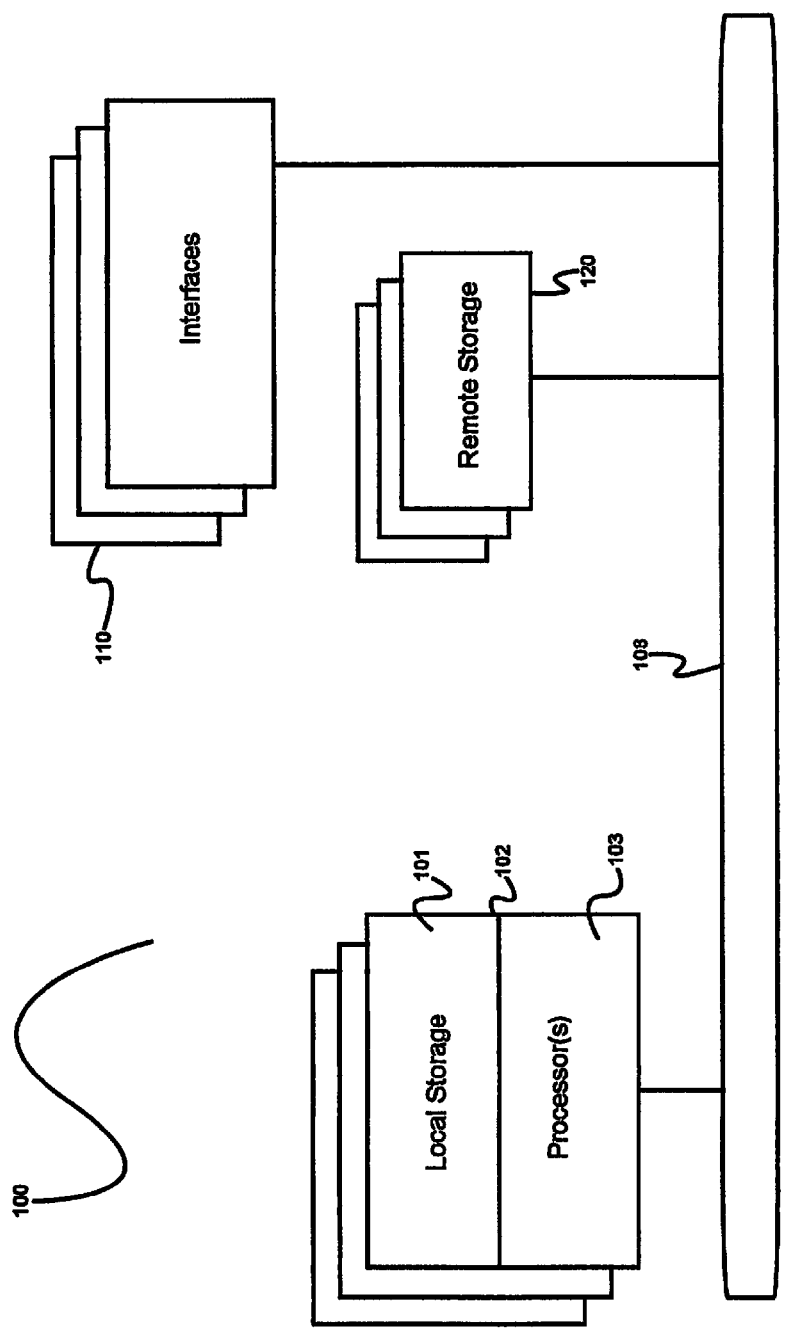
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
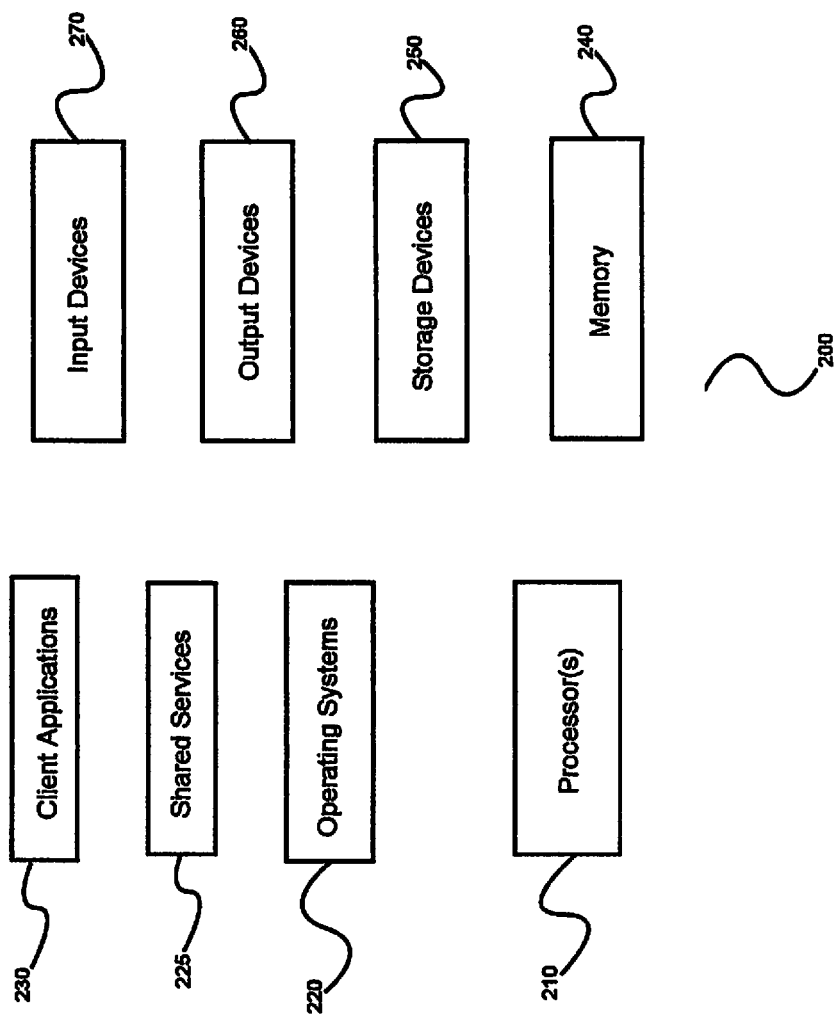
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
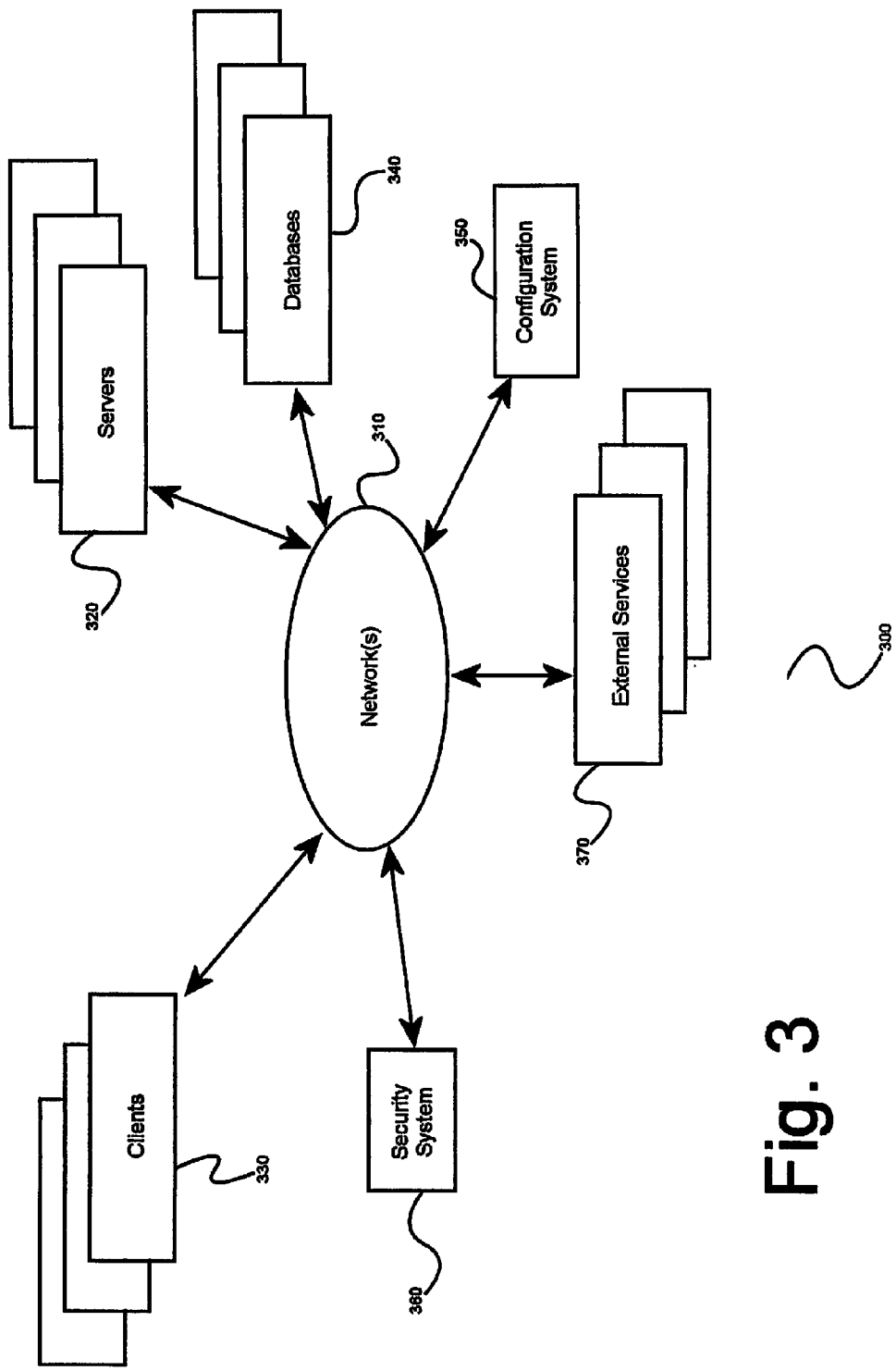
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
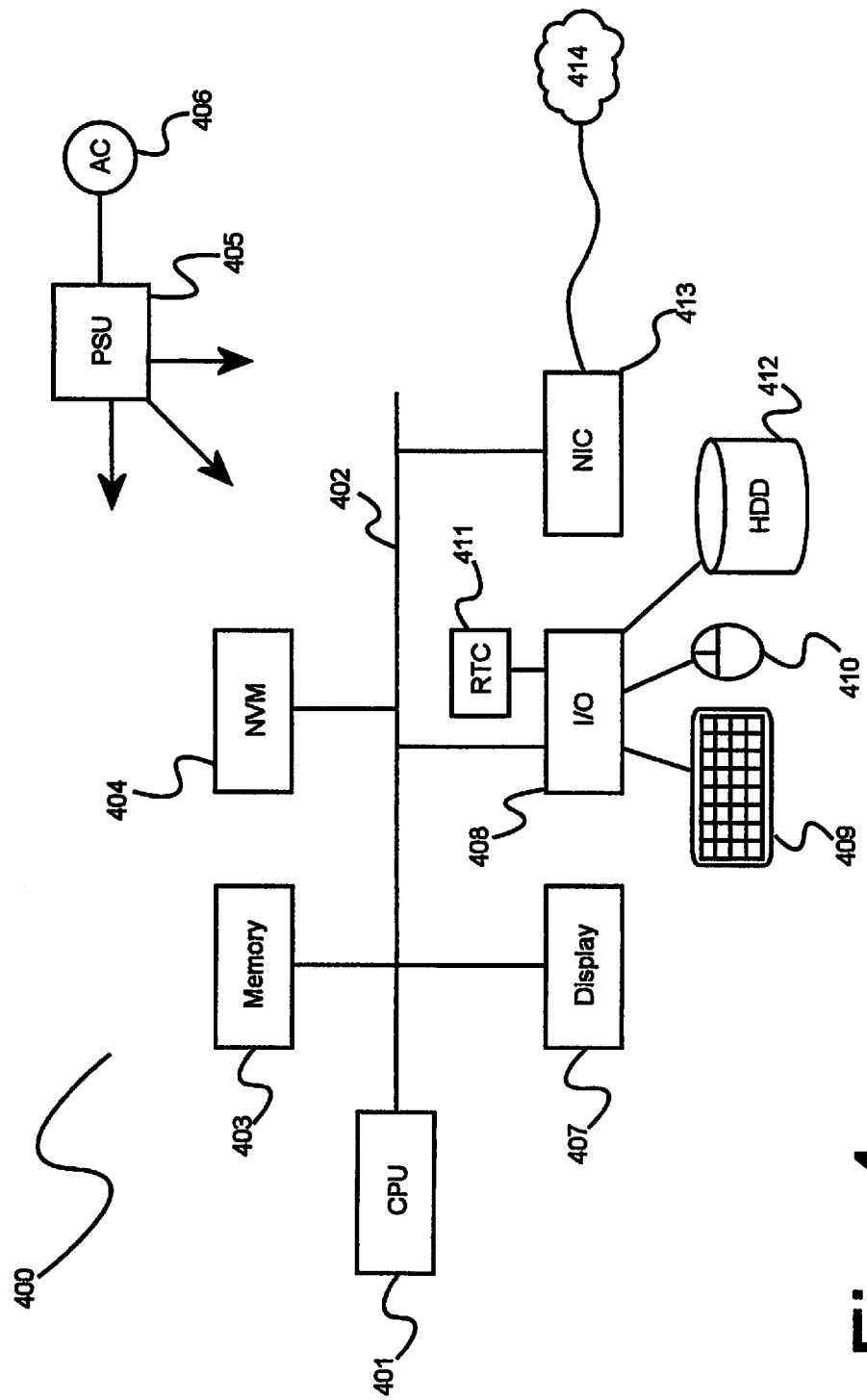
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
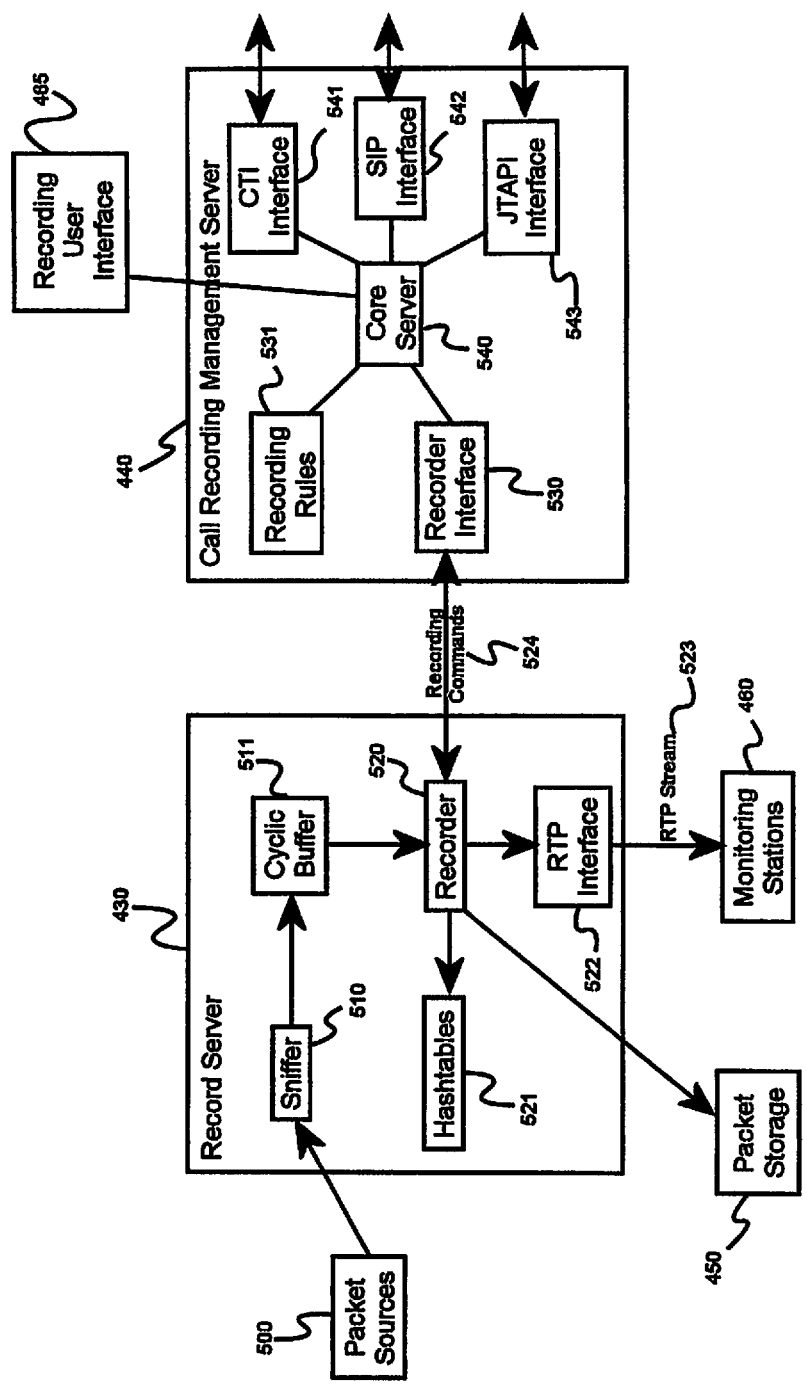
FIG. 5 is a block diagram showing details of call recording management and call recording servers.

FIG. 5 is a block diagram showing details of call recording management and call recording servers. Recording management server 440 is configured to select the communications that are to be recorded in communication environment 400. Core server 540 receives notification from CTI interface 541 that communications for a particular target (for example, all communication packets destined for a specific IP address and port from a specific source IP address and port) as selected by contact center agent selection function known in the art, are to be recorded (herein, referred to as "recording target"). Core server 540 then notifies recorder interface 530 to instruct record server 430 to record communications for the recording target. When recorder 520 receives the recording target's identification information, in this example, a destination IP address and port number, a hash key that corresponds to the identification information for this target, is created in a first hash table (herein, referred to as "hash table one") in hashtables 521.

In a similar process, Core server 540 receives a notification from SIP interface 542 that communications for a particular target (for example, all communication packets that arrive from a specific source IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target's identification information, in this example a destination IP address and port number, a hash key that corresponds to the identification information for this target, is created in a second hash table (herein, referred to as "hash table two") in hashtables 521.

In a similar process, Core server 540 receives notification from JTAPI interface 543 that communications for a particular target (for example, all communication packets destined for a specific IP address and port) as selected by contact center agent selection function known in the art, are to be recorded (herein, also referred to as "recording target"). Core server 540 then notifies recorder interface 530 to instruct record server 430 to record communications for the recording target. When recorder 520 receives the recording target information, a hash key that corresponds to the identification information for this target, is created in a third hash table (herein, referred to as "hash table three") in hashtables 521.

Referring again to FIG. 5, in the typical operation of the system, packets will be moving through the system from a source to a destination. While in a network router, or other IP networking peripheral, the packets will arrive at packet source 500 (for example a SPAN port, IP tap, or another packet mirroring port known in the art). Sniffer 510 then captures the packets from packet source 500 and passes the packet to cyclic buffer 511. When a packet is received in cyclic buffer 511, recorder 520 is notified. Recorder 520 then analyzes the packet contents and compares the information to the hash tables in hashtables 521. If the identification information (for example, destination IP address, destination port, source IP address, and source port) match an entry in hash table one of hashtables 521 that corresponds to the identification information for this recording target, the system keeps the packet for further processing (herein, referred to as "packet of interest"). Otherwise, if the identification information of the packet does not correspond to any entries in hash table one of hashtables 521, a new set of identification information is set (for example, destination IP address and destination port) and compared to the entries in hash table two of hashtables 521. If the identification information (for example, destination IP address and destination port) match an entry in hash table two of hashtables 521 that corresponds to the identification information for this recording target, the system keeps the packet for further processing (herein, referred to as "packet of interest"). Otherwise, if the identification information of the packet does not correspond to any entries in hash table two of hashtables 521, a new set of identification information is set (for example, the source IP address and source port) and compared to the entries in hash table three of hashtables 521. If the identification information (for example, source IP address and source port) match an entry in hash table three of hashtables 521 that corresponds to the identification information for this recording target, the system keeps the packet for further processing (herein, referred to as "packet of interest"). Otherwise, if the identification information of the packet does not correspond to an entry in hash table three nor any of the other hash tables, the packet is discarded.

Once a packet of interest is identified in cyclic buffer 511 by recorder 520 as outlined above, the packet is copied to packet storage 450 using a standard packet capture library (for example, PCAP, WinCAP, or another packet capture function available in the art). If a request to monitor a recording target is requested by recording user interface 465, then core server 540 sends a request through recorder interface 530 to recorder 520 to pass all the corresponding packets of interest to RTP interface 522. RTP interface 522 forwards RTP stream 523 (that is, the payload component of an IP communication) to monitoring station 460 for the communication to be monitored.

Detailed Description of Exemplary Embodiments

Figure 6:
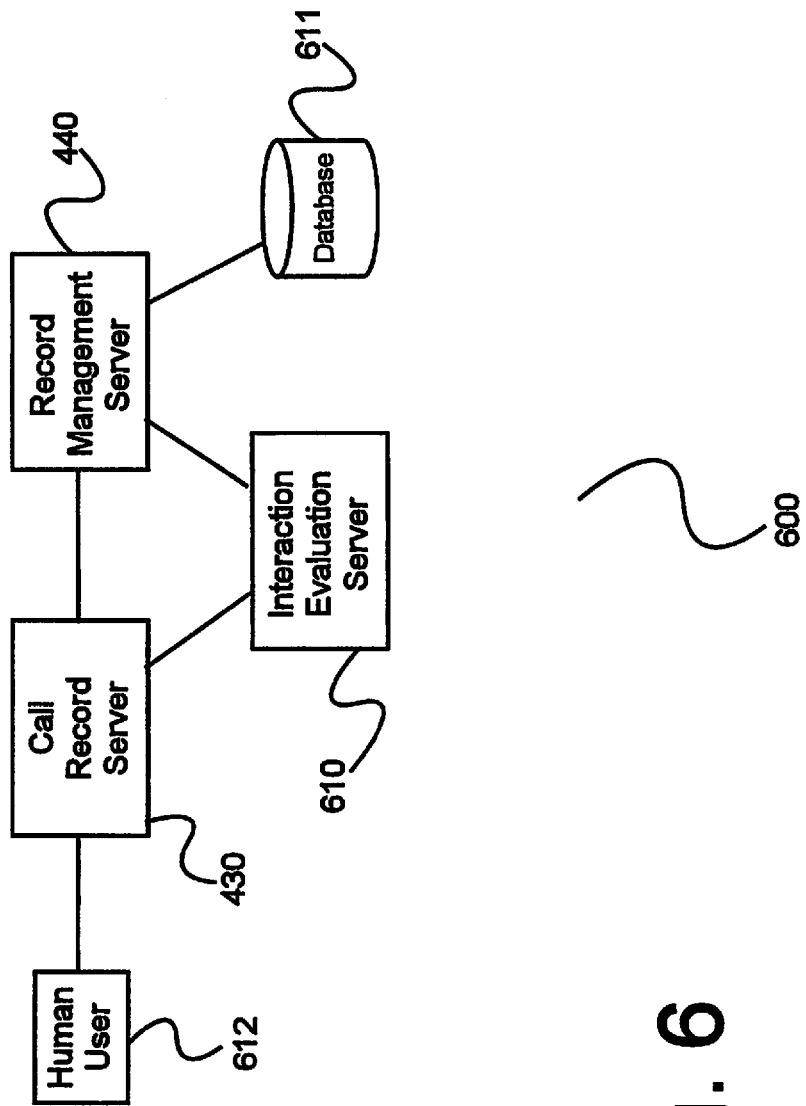
FIG. 6 is a block diagram of an exemplary system for complex interaction recording, according to a preferred embodiment of the invention.

FIG. 6 is a block diagram of an exemplary system 600 for complex interaction recording, according to a preferred embodiment of the invention. As illustrated, a call recording management server 440 may be utilized such as to perform call recording functions (such as described previously, referring to FIG. 5), and to optionally store call recordings in a database 611 or provide them to a call record server 430 for use (such as presenting to a human user 612 for interaction or review). It should be appreciated that a database 611 may be any appropriate data storage means, such as including (but not limited to) integral or removable physical storage media such as optical storage discs or magnetic storage drives, or software-based electronic data storage schema such as SQL™ or other appropriate database storage schema common in the art, and it should be appreciated that such storage may be physically located either locally with other components of system 600 (such as a locally-maintained storage device) or remotely (such as cloud-based or networked storage means as are common in the art), interchangeably as appropriate according to a particular arrangement.

As illustrated, an interaction evaluation server 610 may be utilized to facilitate complex interaction recording, such as by identifying components of an interaction and facilitating their grouping into complex interactions as appropriate. In some embodiments, interaction evaluation server 610 may then divide a complex interaction into segments either to original segments, or a new set of segments, or another configuration of segments. Complex interactions may then be stored for future use in a database 611, optionally with associated or embedded media "tracks", such as the audio recording of a particular call that was evaluated (such that a human user 612 may, for example, listen to a call as it was recorded, while viewing complex interaction information regarding the content of that call), or a video recording of a contact center agent's screen during a call (such that a human user 612 may, for example, view an agent's actions as they were performed while reviewing an interaction). Furthermore, it can be appreciated that by connectivity between an interaction evaluation server 610 and a call recording management server 440, complex interaction recording may be provided by a call recording management server during call recording (i.e., while a call is initially being monitored and recorded), as well as after a call is recorded, such as by loading previously-recorded calls and identifying and grouping interactions from the recorded data. In this manner, it can be appreciated that complex interactions may be identified and stored both while a call is in progress or "live" (and therefore while an interaction is still incomplete and ongoing, as described in further detail below), as well as after an interaction may have been concluded, using stored data (such as to take a collection of stored call records and perform complex interaction evaluation on the data to identify complex interactions from historical data), enabling the use of complex interaction recording on stored data to further enhance operations without necessarily waiting for new data.

As previously mentioned, complex interaction recording may be performed "live", or while a call is ongoing and in progress. In such cases, an interaction may be recorded while still incomplete, such as a call that is in progress or an email conversation spanning multiple days that has not yet been concluded (e.g., a customer's issue is not yet resolved and the conversation is ongoing). In such instances, complex interactions may be recorded according to known data as it is available, and as new data becomes available it may be added to a complex interaction or "appended", such as adding a new email message to a complex interaction grouping when it is received or analyzed by an interaction evaluation server. Additionally, it may be appreciated that it becomes possible that an interaction may be identified with unknown parties, such as a caller whose personal information is not known, making the identification or grouping of additional interaction segments difficult. In such cases, a temporary user may be utilized, such as to act as a "placeholder" to facilitate the recording of an interaction while waiting for further data or clarification. For example, if a caller calls into a contact center form an unknown phone number, a temporary user may be created for the caller and interaction data may be associated with this temporary user. If, at any later point during an interaction (or optionally during separate interactions) information becomes available to identify the caller (such as the caller providing an account number, or later calling from a known phone number), any existing data that was associated with the temporary user may then be reassigned to the known user (such as to incorporate the data with any additional known interactions or data for that particular caller). It should also be appreciated that this method may be utilized to reassign interactions or data between known users as needed, for example if a customer calls in regard to their spouse's account (or any other account on which they may have authorization), any information from their interaction may be grouped under the account holder's user so that interaction information may be available when needed even though it may not have directly involved the account holder themselves.

As further illustrated, a call record server 430 may be connected to a call recording management server 440 and an interaction evaluation server 610, either simultaneously or interchangeably. In this manner, administration of call records as well as configuration of system behavior (such as configuring rules or preferences for forming complex interactions) may be performed, and complex interactions may be observed as they are being recorded by an interaction evaluation server 610. In this manner, call analysis may be performed on stored recordings (as is common in the art), as well as "live", or while a call is ongoing, and additional interaction details such as previous communication, personal information (for example, social media user information, telephone number, customer account information, and the like), or contact details, or any other such information may be viewed or interacted with as a call is ongoing. It should be appreciated that in such a configuration, the manner in which complex interactions may be determined or formed may be configurable, such as via stored configuration information or by manual or programmatic configuration, for example manual user input via a recording management server 440 or via rules-based configuration or machine learning.

Figure 7:
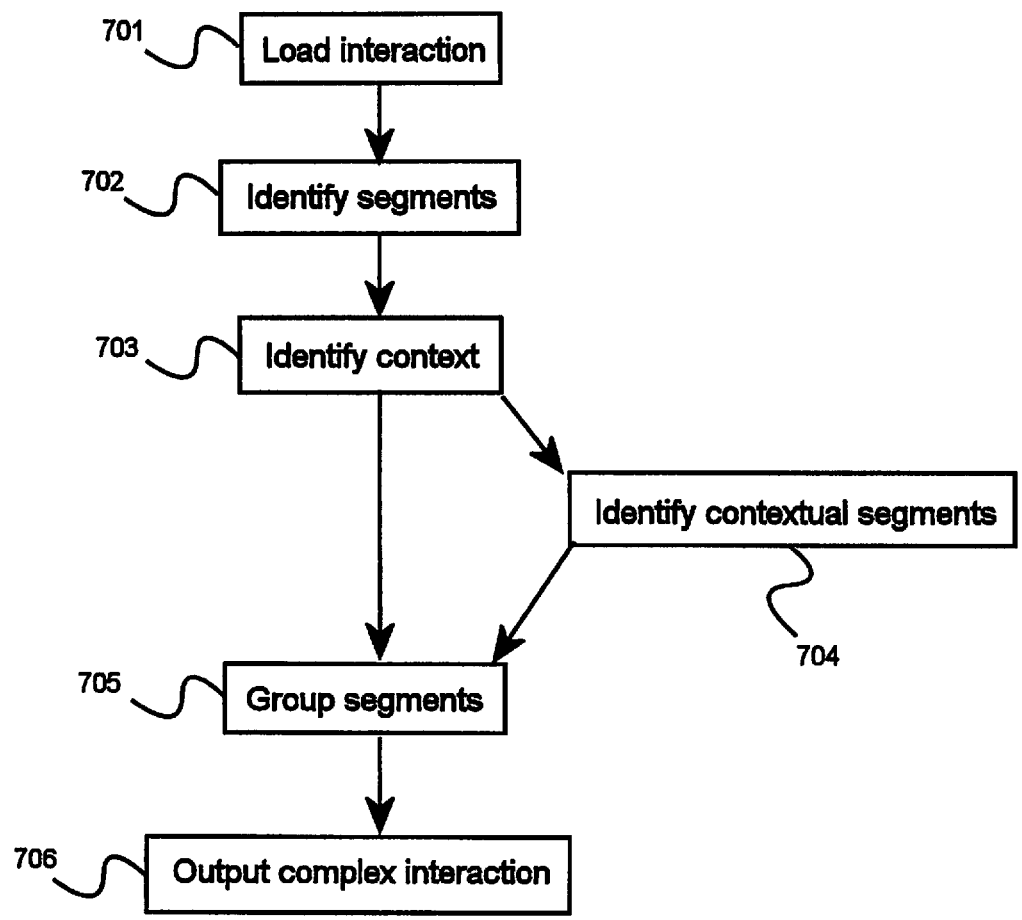
FIG. 7 is a method diagram of an exemplary method for complex interaction recording, according to a preferred embodiment of the invention.

FIG. 7 is a method diagram of an exemplary method 700 for complex interaction recording, according to a preferred embodiment of the invention. As illustrated, in an initial step 701 an interaction may be loaded (such as by monitoring a call as it is taking place, or by retrieving a previously-stored record for analysis). In a next step 702, interaction segments may be identified, such as determining the parties involved in a telephone call and associating each party with their respective audio stream, or (for example) identifying when an email was sent to a customer and incorporating the resulting email conversation as an interaction segment. In a next step 703, interaction context may be identified, such as identifying when a future call was scheduled, or identifying the reason for a call (such as when a contact center agent makes a selection or notation based on input from the caller) and thereby determining any historical calls that may fall within the scope of the interaction (for example if the customer has called about the same issue recently), and in an optional step 704 additional interaction segments based on identified context (such as retrieving call records for a previous call as described above, and performing interaction analysis on those records to determine additional segments or context) may be loaded (such as by accessing stored call recordings). In a next step 705, interaction segments may be grouped into a complex interaction (such as grouping multiple calls concerning a single customer together as a single complex interaction associated with that customer, such as when a customer calls repeatedly about a single issue), and in a final step 706 the resulting complex interaction recording may be sent as output to be optionally stored, viewed, interacted with, or any other potential use for an interaction record.

It should be appreciated that segment grouping as described above may vary in behavior and may be configurable (such as by an administrator or by loading a stored configuration). For example, call segments (such as a customer calling into a contact center regarding an issue) may be grouped together based on a number of criteria such as the identity of the caller, the identity of the agent handling the call, the reason for calling, or any of a number of criteria that may be used to differentiate between individual call records. Chat interactions (such as internet-based instant messenger or other chat-based communications) may be grouped together based on a configurable timeframe, for example "all chat messages within a two-hour period" could be grouped as a single segment, such that if a participant closes and re-opens a chat window or program, it may still be grouped within an interaction segment. Email messages may be grouped as individual segments, or an email conversation may be grouped together as a single segment when appropriate (for example, if two parties discuss a single issue within a short timeframe). Social media messages such as messages posted to social networking services such as TWITTER™ or FACEBOOK™ may also be considered segments when available, for example matching messages to a client based on a known user profile or email address used for such services. Social media messages may be grouped according to a user posting them or according to posting time, for example grouping al messages within a specific or configurable timeframe as a single segment to be incorporated in an interaction (for example, if a user posts several messages within a short timespan regarding a single issue). In this manner, it can be seen that a variety of communication means may be incorporated in a complex interaction, and the particular grouping of communications or segments may vary based on several factors such as the nature or content of a particular communication, or based on configurable behavior preferences such as may be set by a human administrator of a system 600 and stored in a database 611.

Figure 8:
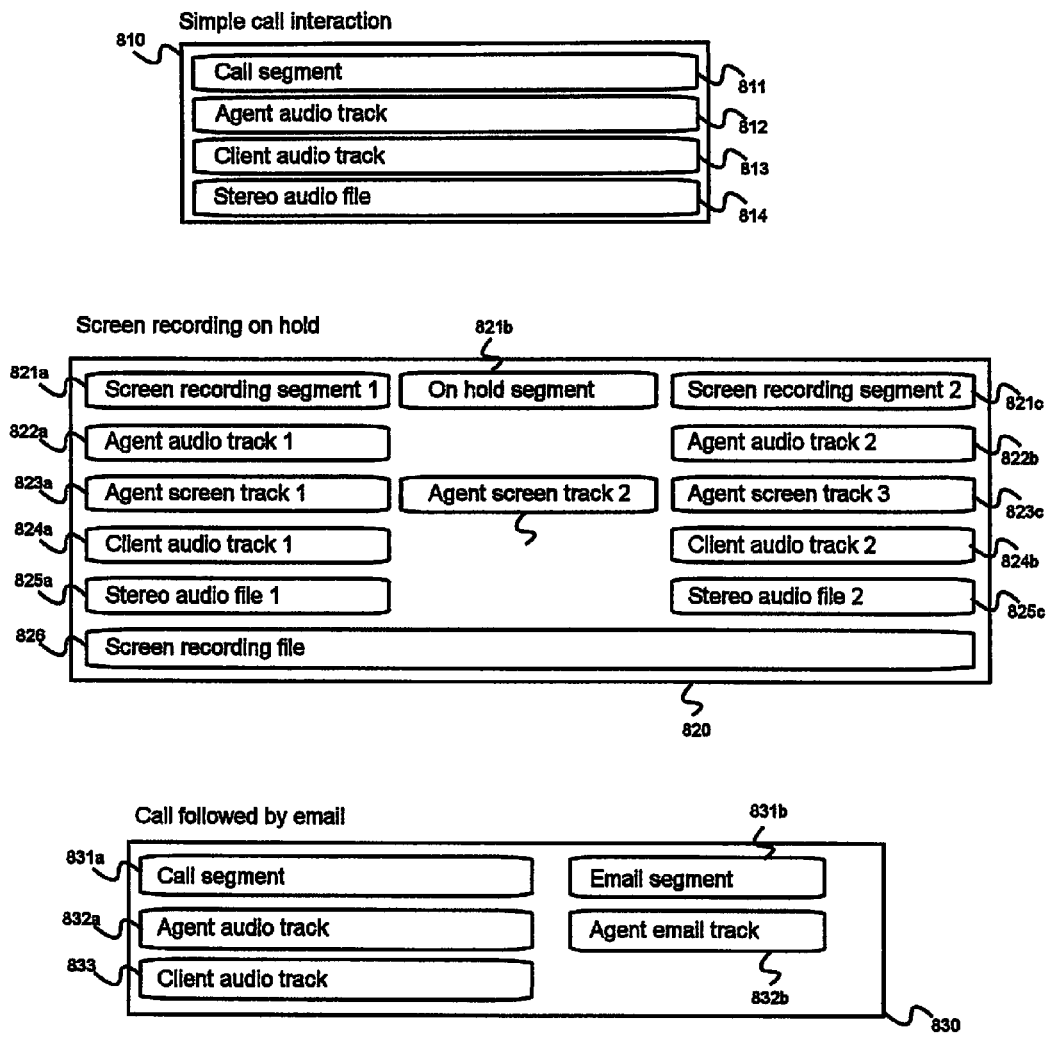
FIG. 8 is an illustration of several exemplary complex interactions, illustrating various interaction structures and arrangements.

FIG. 8 is an illustration of several exemplary complex interactions 810, 820, 830, illustrating various interaction structures and arrangements. As illustrated, a complex interaction 810 for a simple telephone call (such as a client calling a contact center, speaking with a single agent, then disconnecting after the issue is resolved) may comprise a segments 811 that may be associated with a plurality of tracks 812 such as audio recordings of call participants, and a media file 813 such as an audio file created at the time the call was initially recorded. As illustrated, more than one track may be associated with a single segment, as a segment may be considered to be an interaction between multiple parties (in this case, one client and one agent) using a single communication method (in this case, a single telephone call).

A more complex call example may be seen as a complex interaction 820 for a call placed on hold, with agent screen capture enabled. As illustrated, multiple segments 821*a-c* may be grouped into a single complex interaction, such as to identify when changes in interaction between parties occurred (such as, as illustrated, when a call is placed on hold 821*b*, then when a call is resumed 821*c* and communication between an agent and customer continues). Each segment may then be associated with a plurality of tracks, such as an agent's audio recording track 822*a* from a portion of a call while the agent was communicating with the caller, an agent's screen recording track 823*a* from a portion of the call when an agent's screen was recorded during communication, and a client audio track 824*a* from a portion of the call when a caller was communicating with the agent. When the call is placed on hold, the new "on hold" segment 821*b* may not be associated with an audio track (as the call is on hold, no communication is taking place and no audio is being recorded), but may be associated with an agent's screen recording track 823*b* from a portion of the call when the audio was on hold but an agent was still performing actions on their computer screen. When the call is resumed 821*c*, it can be seen that audio recording resumes and new audio tracks for the agent 822*c* and client 824*c* are associated with the new "call resumed" segment 821*c*. As illustrated, a single media file may have multiple tracks extracted for association with interaction segments, such as an agent's screen recording file 826, which it can be seen is a single recorded file that may be associated with a plurality of segments during an interaction, each of which may be further associated with a particular portion of the media file (such as portions of a call when an agent's screen was being recorded but the nature of the interaction changed, in this case when a call was placed on hold and when it was subsequently resumed). Additionally, multiple separate audio files may be associated with separate segments as needed, for example a single audio recording for an initial portion of a call when an agent was speaking with a client 825*a*, and a second separate recorded file for a later portion of the call when an agent resumed speaking with the client 825*b* after placing them on hold for a time. In this manner, it can be seen that a variety of associations may be formed between interaction elements, and that not all associations need be a strict one-to-one correlation (that is, multiple elements may each be associated with a single element, and vice versa, as appropriate).

A third exemplary complex interaction 830 is shown to illustrate an instance of a call followed by an email (such as a confirmation email sent to a client after a call is concluded). As illustrated, a call may comprise multiple audio tracks 832*a*, 833 in a single segment 831*a* (as described above) for a call portion of the interaction. After a call is concluded, a new segment 831*b* may begin, comprising a single track wherein an agent sends an email to the caller 832*b* after the call's conclusion. In this manner it can be seen that an interaction may encompass actions from only some but not all parties involved in an interaction, such as when an agent takes relevant actions after a call is disconnected. Therefore it can be seen that even actions that do not directly involve a particular participant or party (such as, in this case, the client that initiated the call) may be associated with that party based on their relevance to an interaction.

The skilled person will be aware of a range of possible modifications of the various embodiments described above. Accordingly, the present invention is defined by the claims and their equivalents.

What is claimed is:

1. A system for complex interaction recording, comprising:
   a recording management server stored and operating on a network-connected computing device;
   an interaction evaluation server stored and operating on a network-connected computing device; and
   a record server stored and operating on a network-connected computing device;
   wherein the recording management server records multiple parties and multiple communication methods over multiple time periods;
   wherein the interaction evaluation server groups recordings of the multiple parties and the multiple communication methods over the multiple time periods into a complex interaction wherein the multiple communication methods comprise at least a telephone call and an email;

wherein the interaction evaluation server monitors and analyzes an ongoing communication while displaying previous, related complex interactions each comprising at least a telephone call;

further wherein the interaction evaluation server stores the complex interaction in a single media file; and wherein the record server presents the complex interaction to a human user.

2. A method for complex interaction recording, comprising the steps of:
  (a) recording, using a recording management server stored and operating on a network-connected computing device, multiple parties and multiple communication methods over multiple time periods;
  (b) grouping, using an interaction evaluation server stored and operating on a network-connected computing device, recordings of the multiple parties and multiple communication methods over the multiple time periods into a complex interaction wherein the multiple communication methods comprise at least a telephone call and an email;
  (c) monitoring and analyzing an ongoing communication while displaying previous, related complex interactions each comprising at least a telephone call;
  (d) storing the complex interaction in a single media file; and
  (e) presenting the complex interaction to a human user.

* * * * *